Dec. 18, 1962 J. BUCHLEITNER 3,068,668
ARTICULATED JOINTS
Filed May 22, 1961
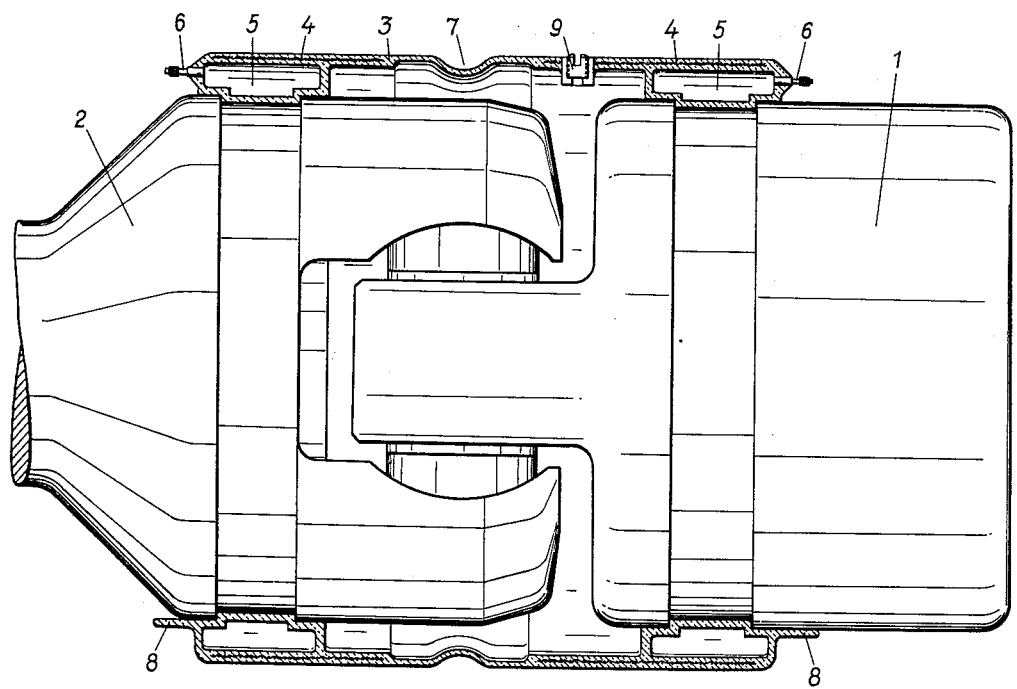

United States Patent Office 3,068,668
Patented Dec. 18, 1962

3,068,668
ARTICULATED JOINTS
Johann Buchleitner, Kapfenberg, Styria, Austria, assignor to Gebr. Böhler & Co. Aktiengesellschaft, Vienna, Austria
Filed May 22, 1961, Ser. No. 111,716
Claims priority, application Austria May 25, 1960
2 Claims. (Cl. 64—32)

This invention relates to a protective covering for articulated joints, which covering protects the articulated joint from being soiled and serves also to cover the lubricating against the environment.

It is known to provide articulated joints with coverings of impregnated fabrics, plastics or rubber and to secure the ends of such protective coverings on the shafts with clip hoops. Since such fastening does not afford a liquid-tight seal, the articulated joints may be lubricated only with consistent lubricants. In conjunction with rotary joints the use of these solid or semisolid lubricants has the disadvantages that particles of lubricant are thrown off the joint by centrifugal force and cannot contribute to the lubricating action.

To force the lubricant against the articulated joints and yet to achieve a lubricating effect, the protective covering must be closely applied to the articulated joints. This has the disadvantage that these protective coverings can be removed only with great difficulty when parts of the joint are to be replaced or repairs are to be carried out and that great difficulties are also involved in the subsequent application of the covering.

In order to avoid these difficulties, the invention proposes to use a protective shell which is provided at its ends with inflatable hoses, which ensure a tight seal of the protective covering, which consists of a flexible sleeve at the ends thereof.

The invention will be explained with reference to an illustrative embodiment shown on the accompanying drawing.

The two parts of the articulated joint consisting of the wobbler 1 and the articulated spindle 2, are provided each with elevations, noses or grooves engaged by ends of the protective covering 3. The protective covering covers the articulated joint throughout the length thereof and is provided at the ends with one or more hoses 5. Each of these hoses is provided with a valve 6. They are inflated until they tightly engage the grooves or noses of the articulated parts. That portion of the protective covering which is disposed between the end hoses has an oil filling opening 9.

The protective covering consists of a material which is not permeable by the lubricant, e.g., of an oil-resisting plastic. This material must be flexible to be able to follow the movements of the joint. It is suitable to provide reinforcing inserts 4 of textile or woven wire fabric in the material of the covering. To be able to follow the angular movements of the joint, the covering is provided wtih one or more expansion beads 7.

Since the protective covering is oil-tightly closed at its ends, it can be filled with oil so that the articulated joint can be lubricated only with oil rather than grease. This will considerably improve the lubrication of the articulated joint, which will be immersed in the oil in any position.

After a replacement of a roll or after repairs, the oil withdrawn before the replacement may be re-used because the covering prevents a soiling of the oil.

To carry out repairs, it is sufficient to deflate one of the end hoses through the valve and to turn the covering inside out. The withdrawal or turning inside out of the covering may be facilitated by lugs 8 provided at the ends of the covering.

What I claim is:
1. An articulated joint, which comprises two articulated parts having each an annular surface irregularity on the outside surface thereof, and a protective covering comprising a flexible sleeve of oiltight material having at each end an inflated peripheral hose disposed on the inside of said sleeve, each of said hoses being in sealing engagement with one of said articulated parts and interlocking with said annular surface irregularity thereof.
2. An articulated joint as set forth in claim 1, in which said surface irregularity comprises an annular groove.

References Cited in the file of this patent
UNITED STATES PATENTS

| | | |
|---|---|---|
| 992,075 | Bates | Mar. 22, 1900 |
| 1,967,466 | Damsel | July 24, 1935 |
| 2,264,728 | Stillwagon | Dec. 2, 1941 |
| 2,863,681 | Robbins | Dec. 9, 1958 |